(12) United States Patent
Chen et al.

(10) Patent No.: US 12,529,315 B2
(45) Date of Patent: Jan. 20, 2026

(54) ENERGY DEVICE FOR SHIELD MACHINES

(71) Applicant: China Railway Sunward Engineering Equipment Co., Ltd., Guangzhou (CN)

(72) Inventors: Qi Chen, Guangzhou (CN); Yansong Feng, Guangzhou (CN)

(73) Assignee: China Railway Sunward Engineering Equipment Co., Ltd., Guangzhou (CN)

( * ) Notice: Subject to any disclaimer, the term of this patent is extended or adjusted under 35 U.S.C. 154(b) by 55 days.

(21) Appl. No.: 18/773,614

(22) Filed: Jul. 16, 2024

(65) Prior Publication Data

US 2024/0368990 A1 Nov. 7, 2024

Related U.S. Application Data

(63) Continuation of application No. PCT/CN2023/101335, filed on Jun. 20, 2023.

(30) Foreign Application Priority Data

Dec. 8, 2022 (CN) .......................... 202211569542.1

(51) Int. Cl.
*E21D 9/06* (2006.01)
(52) U.S. Cl.
CPC .................. *E21D 9/0621* (2013.01)

(58) Field of Classification Search
CPC .......... E21D 9/06; E21D 9/0621; E21D 9/093
See application file for complete search history.

(56) References Cited

U.S. PATENT DOCUMENTS

| | | | | |
|---|---|---|---|---|
| 2007/0085409 A1* | 4/2007 | Drake | ...................... | E21D 9/13 299/8 |
| 2021/0317739 A1* | 10/2021 | Ju | .............................. | E21D 9/10 |
| 2023/0203947 A1* | 6/2023 | Zhang | ..................... | E21C 41/18 299/19 |

* cited by examiner

*Primary Examiner* — Kyle Armstrong

(57) ABSTRACT

An energy device for shield machines disclosed by the application comprises: a trolley structure arranged behind the shield machine; a power management system arranged on the trolley structure and electrically connected with the shield machine main body; a solid-state energy cell arranged on the trolley structure; wherein, the solid-state energy cell is connected with the power management system and used for providing electric energy output; and an inverter system arranged between the power management system and the solid-state energy cell, wherein the inverter system is used for controlling the charging input or power supply output of the solid-state energy cell. The energy device for shield machines disclosed by the application is safe and environment-friendly, can replace the diesel generator as the emergency energy source of shield machines, provides stable power supply, and reduces the power consumption cost of the shield machine.

10 Claims, 9 Drawing Sheets

ENERGY DEVICE FOR SHIELD MACHINES

TECHNICAL FIELD

The invention relates to the technical field of energy equipment of shield machines, in particular to an energy device for shield machines.

BACKGROUND

As a large-scale electromechanical equipment used in underground tunnel construction, shield machine has the reputation of "the king of construction machinery". Because of the particularity of its working environment, when designing the electrical system of the shield machine, the design scheme of the equipment with its own 10 kV transformer is mainly adopted, and the 10 kV power supply of the ground substation is introduced into the equipment through high-voltage cables to realize electric energy input.

During the construction of shield machine, as the tunnel is excavated deeper and deeper, the whole shield machine will gradually show an "island effect" in terms of energy allocation, that is, all energy supply in the tunnel depends on its own high-voltage transformer. Once the transformer fails or the ground power supply fails, the whole shield machine immediately enters the "disabled" state, which not only affects the safe use of the equipment itself, but also poses a great threat to the personal safety of the relevant staff in the tunnel. At present, in order to solve this problem, the shield machine is generally required to be equipped with a diesel generator as an emergency power supply when it is designed. However, the storage of diesel in the sealed space of the tunnel and the sound, heat and toxic and harmful gases caused by the use of the diesel generator will affect the personal health of the construction personnel in the tunnel and cannot meet the construction requirements.

Therefore, how to provide an energy device for the shield machines, which is safe and environment-friendly, can replace the diesel generator as an emergency energy source for the shield machine and provide stable power supply, has become an urgent technical problem for technicians in this field.

SUMMARY

In order to solve the above technical problems, the application provides an energy device for shield machines, which is safe and environment-friendly, can replace a diesel generator as an emergency energy source for the shield machines, provide stable power supply, and reduce the power consumption cost of the shield machines.

The technical scheme provided by the application is as follows:

The application provides an energy device for shield machines, which comprises: a trolley structure arranged behind the shield machine; a power management system arranged on the trolley structure and electrically connected with the shield machine main body; a solid-state energy cell arranged on the trolley structure; wherein, the solid-state energy cell is connected with the power management system and used for providing electric energy output; and an inverter system arranged between the power management system and the solid-state energy cell, wherein the inverter system is used for controlling the charging input or power supply output of the solid-state energy cell.

Further, in a preferred mode of the present invention, the trolley structure comprises:

a trolley main body;
and linkage mechanisms arranged at the front and rear ends of the trolley main body;
wherein, the trolley main body is detachably connected with the shield machine trolley through the linkage mechanism.

Further, in a preferred mode of the present invention, the trolley structure further comprises:
a quick disassembly mechanism arranged on the trolley main body;
and the bottom of the solid-state energy cell is provided with a limiting displacement structure, and the quick disassembly mechanism is clamped with the limiting displacement structure for quickly assembling and disassembling the solid-state energy cell on the trolley main body.

Further, in a preferred mode of the present invention, the energy device for shield machines also comprises:
a quick plug-in connector arranged at the end of the solid-state energy cell.

Further, in a preferred mode of the present invention, the solid-state energy cell is provided with one or more pieces; a plurality of solid-state energy cells are electrically connected with each other through the quick plug-in connector; and the total power supply of the cells can be customized and combined according to the capacity and quantity of the solid-state energy cells.

Further, in a preferred mode of the present invention, the solid-state energy cell includes:
an emergency power supply, an auxiliary power supply and a main power supply;
the power capacities of the emergency power supply, the auxiliary power supply and the main power supply are different, and the total power capacities of the three power supplies are more than twice the total power supply required by the shield.

Further, in a preferred mode of the present invention, one end of the power management system is connected with the inverter system, and the other end is connected with the shield machine main body and the shield transformer;
the power management system includes:
a power-off switching module, which is used for connecting the shield transformer to the shield machine main body and the power management system during normal work, the shield machine is powered by the shield voltage device, and the power-off switching module is also used for disconnecting the shield transformer when it is power off and disabled, and the shield machine is powered by the solid-state energy cell;
and a multi-mode electric energy switching module, which is used for switching on the emergency power supply, the auxiliary power supply or the main power supply according to the working condition requirements and switching to the emergency mode, the auxiliary power supply mode or the whole machine power supply mode.

Further, in a preferred mode of the present invention, the inverter system includes:
an online charging module, wherein the charging input module is used for controlling the charging input of the solid-state energy cell during normal work;
and an online discharging module, which is used for controlling the discharging output of the solid-state energy cell when it is power off and disabled.

Further, in a preferred mode of the present invention, the power management system further comprises:

an electric energy monitoring module, which is used for adjusting the number of cells connected to the system from a plurality of solid-state energy cells according to the real-time charge and power factor.

Further, in a preferred mode of the present invention, the solid-state energy cell is clean and environment-friendly energy.

An energy device for shield machines provided by the present invention comprises: a trolley structure arranged behind the shield machine; a power management system arranged on the trolley structure and electrically connected with the shield machine main body; a solid-state energy cell arranged on the trolley structure; wherein, the solid-state energy cell is connected with the power management system and used for providing electric energy output; and an inverter system arranged between the power management system and the solid-state energy cell, wherein the inverter system is used for controlling the charging input or power supply output of the solid-state energy cell. Wherein, the energy device main body consists of the power management system, the inverter system and the solid-state energy cell, and the trolley structure is arranged below the energy device main body as a support; the trolley structure is connected with the shield machine trolley, and moves along with the shield machine trolley during construction; for electric energy output, the trolley structure is equipped with the solid-state energy cell to replace the diesel generator for power supply output, which is clean and environment-friendly; moreover, the solid-state energy cell is connected with the power management system and the inverter system; when the external power supply works normally, the shield transformer is connected with the shield machine main body for power supply, and the solid-state energy cell is in a charging standby state by using the power management system and the inverter system; when the external power supply is power off and disabled, the shield machine main body disconnects the shield transformer, and the solid-state energy cell provides stable power supply output through the power management system and the inverter system, thus completing the shield operation requirements. Therefore, compared with the current technology, the technical scheme provided by the present invention is safe and environment-friendly, can replace the diesel generator as the emergency energy source of shield machines, provides stable power supply, and reduces the power consumption cost of the shield machine.

BRIEF DESCRIPTION OF DRAWINGS

In order to more clearly explain the embodiments of the present application or the technical scheme in the current technology, the drawings needed in the description of the embodiments or the current technology will be briefly introduced below. Obviously, the drawings in the following description are only some embodiments of the present application, and other drawings can be obtained according to these drawings without creative work for ordinary people in the field.

DETAILED DESCRIPTION OF EMBODIMENTS

Figure 1:
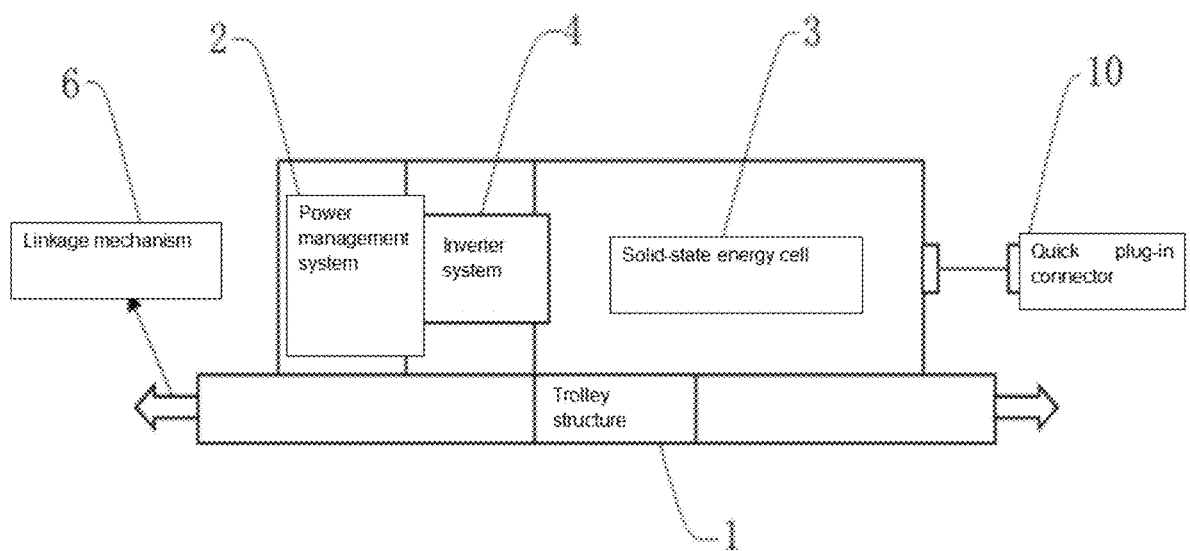
FIG. 1 is a structural schematic diagram of the energy device for shield machines provided by the embodiment of the present invention.

In order to make the technical personnel in this field better understand the technical scheme in this application, the technical scheme in the embodiment of this application will be described clearly and completely with the attached drawings. Obviously, the described embodiment is only a part of the embodiment of this application, but not the whole embodiment. Based on the embodiments in this application, all other embodiments obtained by ordinary technicians in this field without creative work belong to the protection scope of this application.

It should be noted that when an element is said to be "fixed" or "arranged" on another element, it can be directly or indirectly arranged on another element; when an element is said to be "connected" to another element, it can be directly connected to another element or indirectly connected to another element.

It should be understood that the orientation or positional relationship indicated by the terms "length", "width", "up", "down", "front", "back", "first", "second", "vertical", "horizontal", "top", "bottom", "inside" and "outside" is based on the orientation or positional relationship shown in the drawings, and is only for the convenience of describing the application and simplifying the description, and does not indicate or imply that the devices or elements referred to must have a specific orientation, be constructed and operated in a specific orientation, so it cannot be understood as a limitation of the application.

In addition, the terms "first" and "second" are only used for describing purposes, and cannot be understood as indicating or implying relative importance or implicitly indicating the number of indicated technical features. Therefore, the features defined as "first" and "second" may include one or more of these features explicitly or implicitly. In the description of this application, "plural" and "several" mean two or more, unless otherwise specifically defined.

It should be noted that the structure, proportion, size and so on shown in the attached drawings of this specification are only used to match the contents disclosed in the specification for people familiar with this technology to understand and read, and are not used to limit the applicable limiting conditions of this application, so they have no technical substantive significance. Any modification of the structure, change of proportion or adjustment of size should still fall within the scope of the technical content disclosed in this application without affecting the efficacy and purposes that can be achieved in this application.

Figure 2:
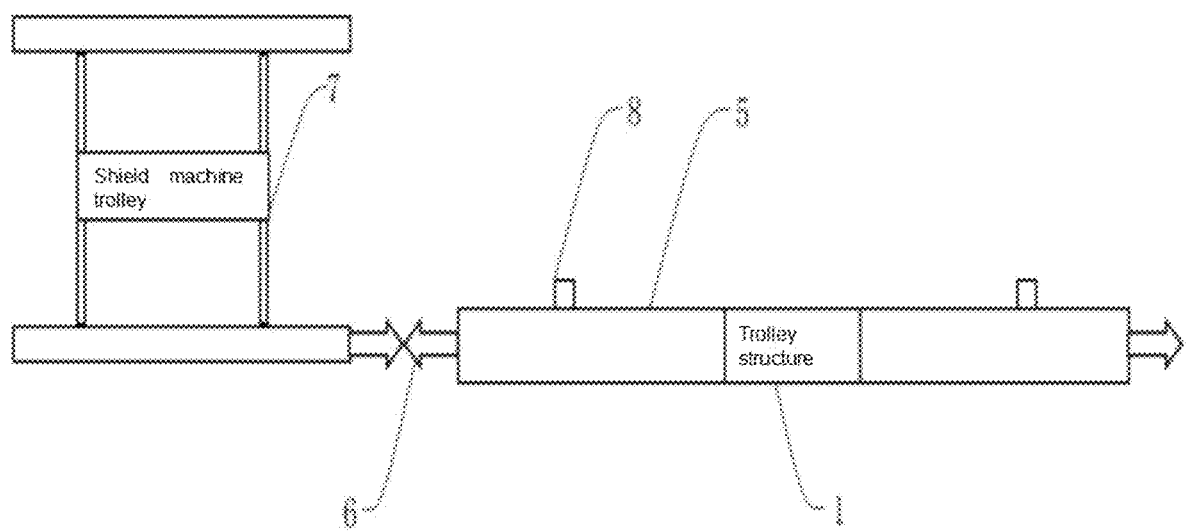
FIG. 2 is an installation schematic diagram of the trolley structure provided by the embodiment of the present invention.
Figure 3:
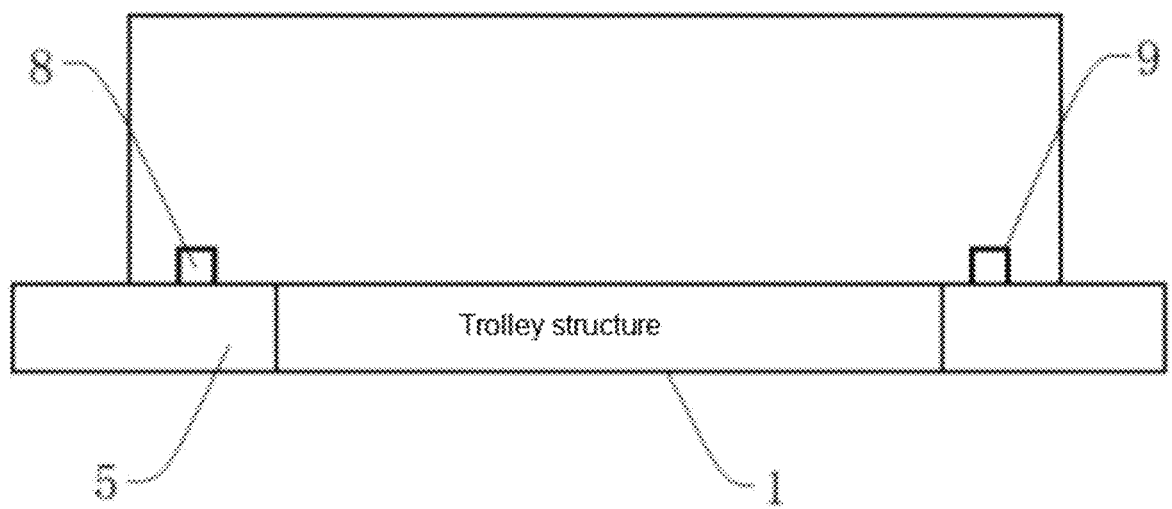
FIG. 3 is an installation schematic diagram of the quick disassembly mechanism provided by the embodiment of the present invention.
Figure 4:
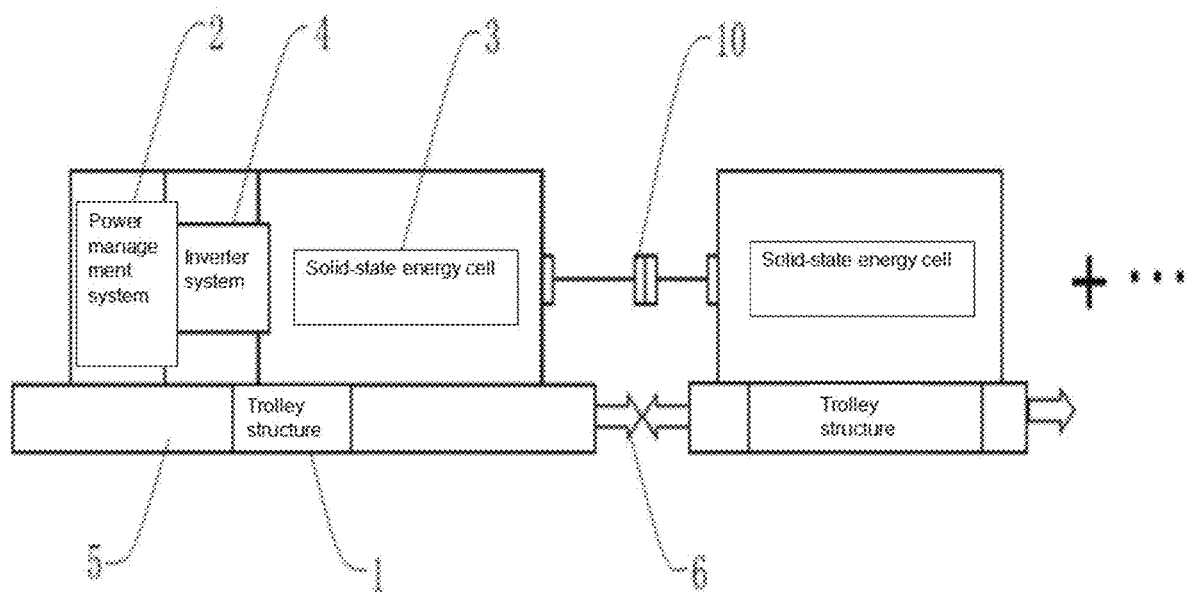
FIG. 4 is a schematic diagram of quick connection of the solid-state energy cell provided by the embodiment of the present invention.
Figure 5:
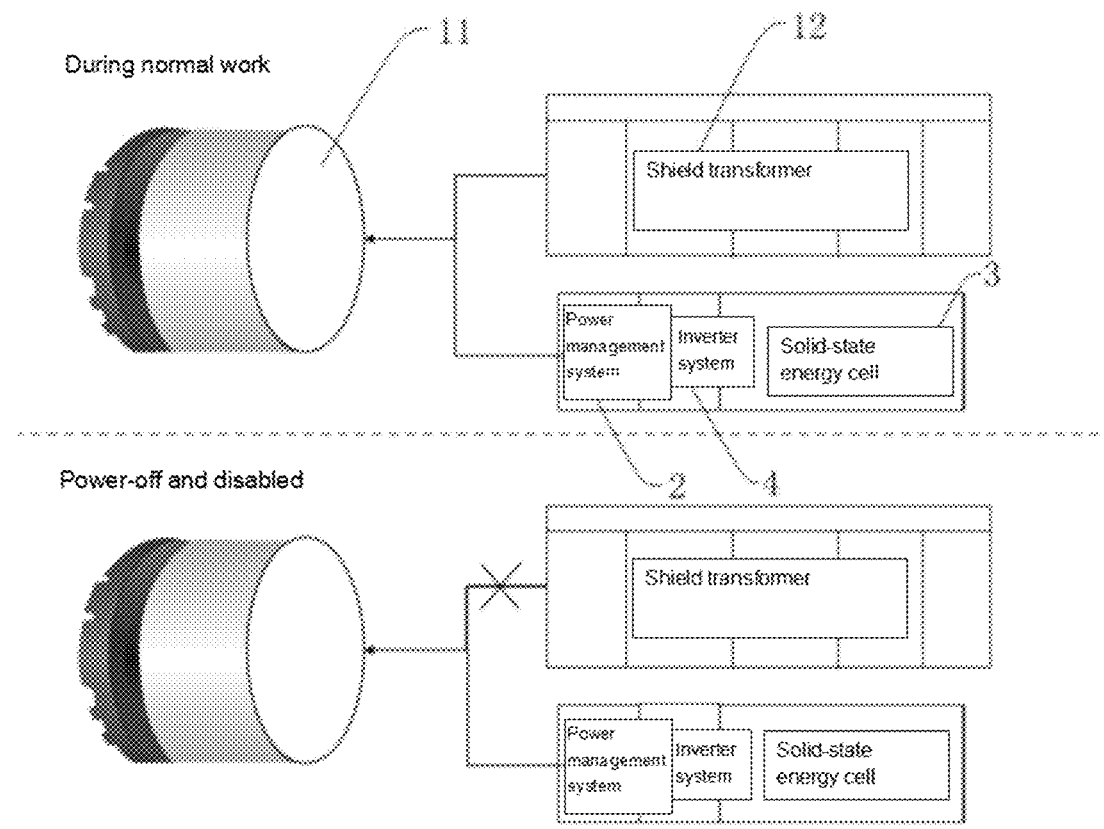
FIG. 5 is the working principle diagram of the emergency power supply of the energy device for shield machines provided by the embodiment of the present invention.
Figure 6:
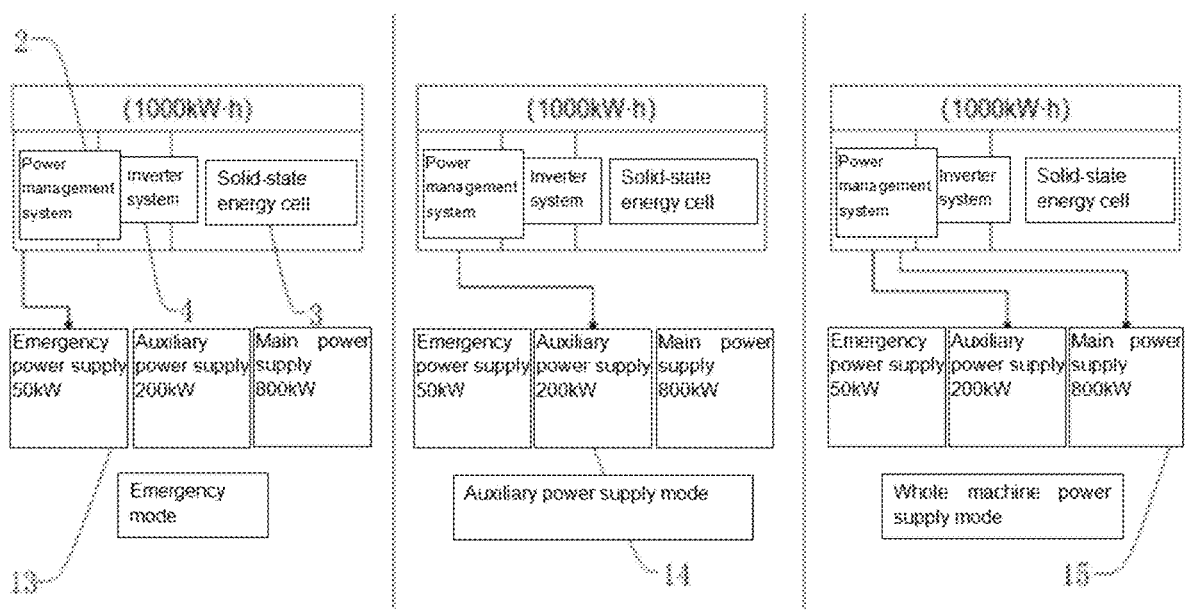
FIG. 6 is the working principle diagram of the multi-mode switching power supply of the energy device for shield machines provided by the embodiment of the present invention.
Figure 7:
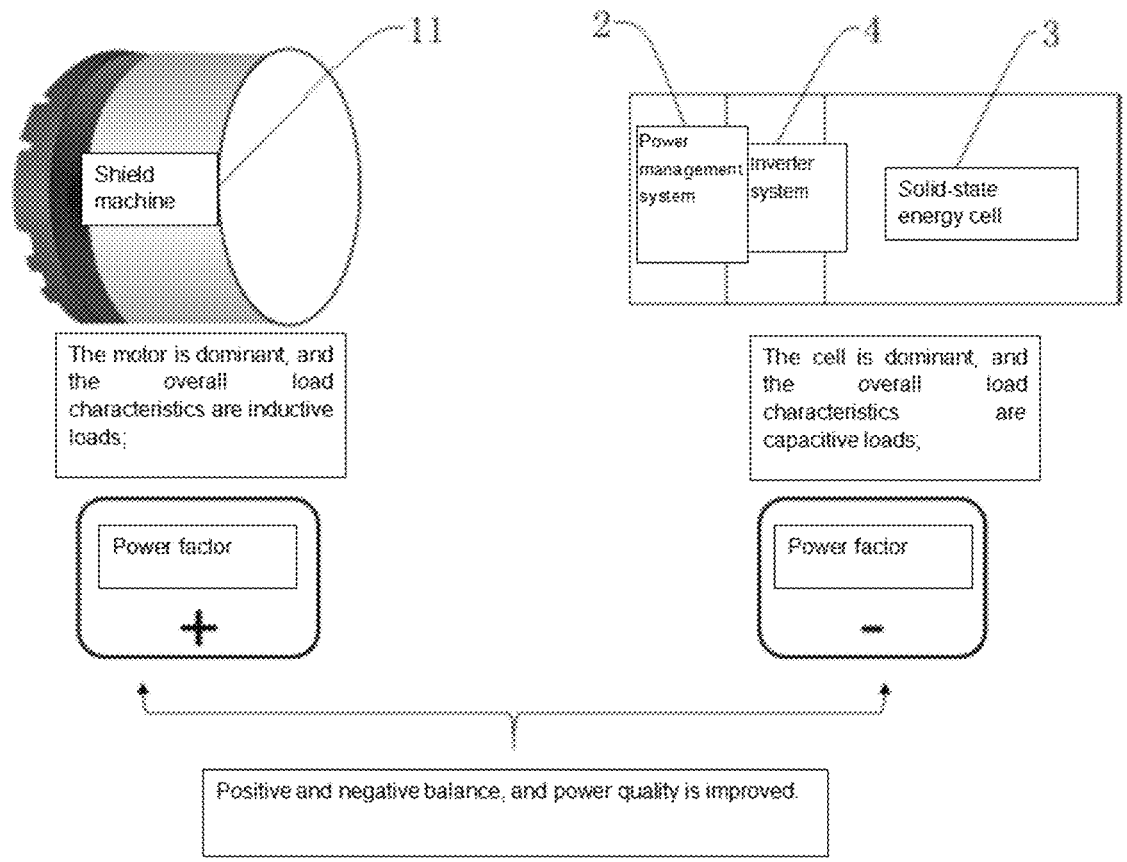
FIG. 7 is a working principle diagram of the power quality improvement of the information energy device for shield machines provided by the embodiment of the present invention.
Figure 8:
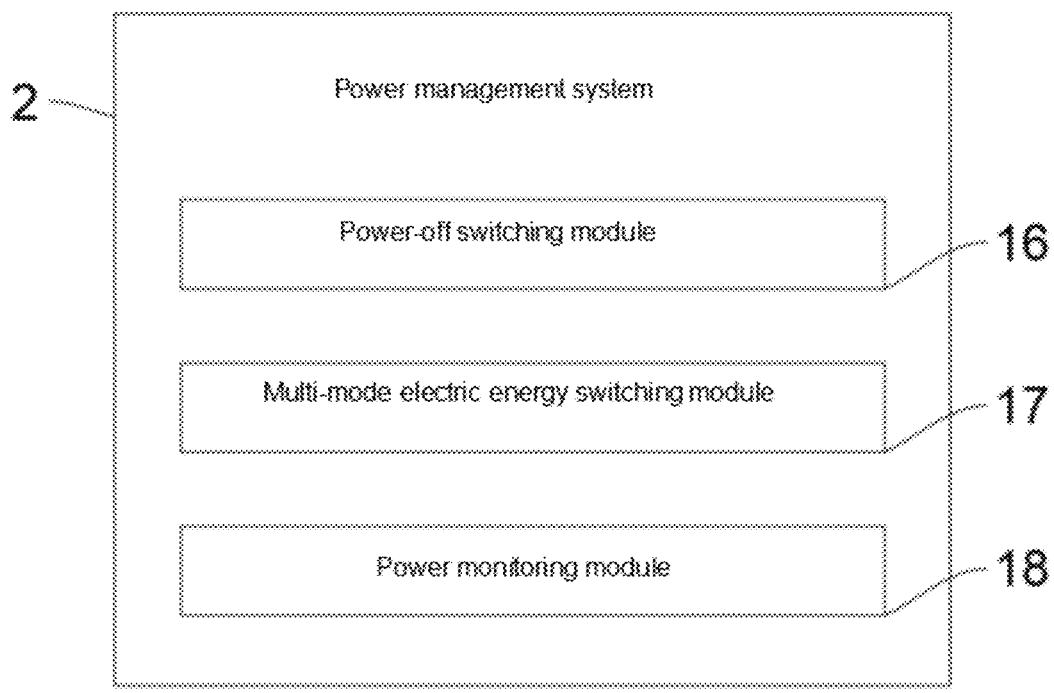
FIG. 8 is a schematic structural block diagram of the power management system provided by the embodiment of the present invention.
Figure 9:
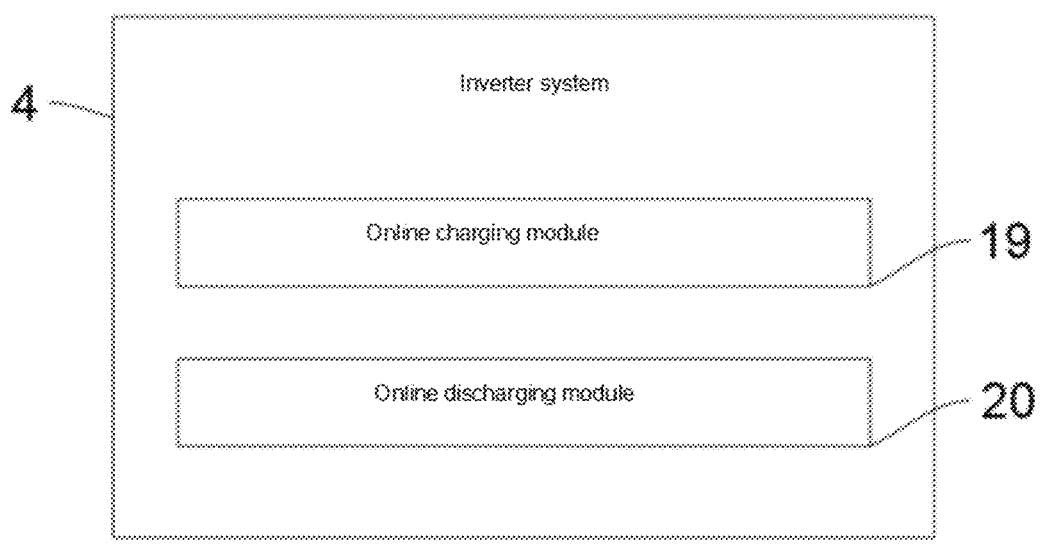
FIG. 9 is a schematic structural block diagram of the inverter system provided by the embodiment of the present invention.

As shown in FIGS. 1 to 9, an energy device for shield machines provided by an embodiment of the present application comprises: a trolley structure arranged behind the shield machine; a power management system arranged on the trolley structure and electrically connected with the shield machine main body; a solid-state energy cell arranged on the trolley structure; wherein, the solid-state energy cell is connected with the power management system and used for providing electric energy output; and an inverter system arranged between the power management system and the solid-state energy cell, wherein the inverter system is used for controlling the charging input or power supply output of the solid-state energy cell.

An energy device for shield machines provided by the present invention specifically comprises: a trolley structure 1 arranged behind the shield machine; a power management system 2 arranged on the trolley structure 1 and electrically connected with the shield machine main body 11; a solid-state energy cell 3 arranged on the trolley structure 1; wherein, the solid-state energy cell 3 is connected with the power management system 2 and used for providing electric energy output; and an inverter system 4 arranged between the power management system 2 and the solid-state energy cell 3, wherein the inverter system 4 is used for controlling the charging input or power supply output of the solid-state energy cell 3. Wherein, the energy device main body consists of the power management system 2, the inverter system 4 and the solid-state energy cell 3, and the trolley structure 1 is arranged below the energy device main body as a support; the trolley structure 1 is connected with the shield machine trolley 7, and moves along with the shield machine trolley 7 during construction; for electric energy output, the trolley structure 1 is equipped with the solid-state energy cell 3 to replace the diesel generator for power supply output, which is clean and environment-friendly; moreover, the solid-state energy cell 3 is connected with the power management system 2 and the inverter system 4; when the external power supply works normally, the shield transformer 12 is connected with the shield machine main body 11 for power supply, and the solid-state energy cell 3 is in a charging standby state by using the power management system 2 and the inverter system 4; when the external power supply is power off and disabled, the shield machine main body 11 disconnects the shield transformer 12, and the solid-state energy cell 3 provides stable power supply output through the power management system 2 and the inverter system 4, thus completing the shield operation requirements. According to the technical scheme provided by the present invention is safe and environment-friendly, can replace the diesel generator as the emergency energy source of shield machines, provides stable power supply, and reduces the power consumption cost of the shield machine.

The technical scheme of the present invention will be described in detail with specific embodiments:

Specifically, in an embodiment of the present invention, the trolley structure 1 comprises: a trolley main body 5; and linkage mechanisms 6 arranged at the front and rear ends of the trolley main body 5; wherein, the trolley main body 5 is detachably connected with the shield machine trolley 7 through the linkage mechanism 6.

In this embodiment, the trolley main body 5 can be provided with a plurality of pieces, which are connected by the linkage mechanism 6 and arranged side by side behind the shield machine main body 11, so as to realize quick splicing of energy modules and meet the requirements of quick installation and separation of the energy devices in the tunnel.

Specifically, in an embodiment of the present invention, the trolley structure 1 further comprises: a quick disassembly mechanism 8 arranged on the trolley main body 5; and the bottom of the solid-state energy cell 3 is provided with a limiting displacement structure 9, and the quick disassembly mechanism 8 is clamped with the limiting displacement structure 9 for quickly assembling and disassembling the solid-state energy cell 3 on the trolley main body 5.

Wherein, in the embodiment of the present invention, the solid-state energy cell 3 is arranged in a standard modular design and has a quick disassembly function. Through the limiting displacement structure 9, it can cooperate with the quick disassembly mechanism 8 in the trolley structure 1 for quick installation and disassembly, so that the solid-state energy cell 3 can meet the functions of landing self-locking and lifting automatic release; moreover, the limiting displacement structure 9 can be docked with the container flat car, so that the solid-state energy cell 3 can be transported and quickly disassembled, and the cell replacement and transportation become extremely convenient.

Specifically, in an embodiment of the present invention, the energy device for shield machines also comprises: a quick plug-in connector 10 arranged at the end of the solid-state energy cell 3.

Specifically, in an embodiment of the present invention, the solid-state energy cell 3 is provided with one or more pieces; a plurality of solid-state energy cells 3 are electrically connected with each other through the quick plug-in connector 10; and the total power supply of the cells can be customized and combined according to the capacity and quantity of the solid-state energy cells 3.

Wherein, in the embodiment of the present invention, the used solid-state energy cell 3 has the function of assembly and combination, which can assemble a plurality of pieces according to different energy requirements and adapt to different use requirements; when assembling, the quick plug-in connectors pre-installed between cell modules are used to realize the connection of cell modules stably and efficiently. By connecting and using standard quick connectors between energy cells, the cells can be quickly connected in series or divided, and each cell module can share a set of power management system 2 and inverter device after connection; moreover, the whole set of energy cells can be configured with different numbers of replaceable solid-state energy cells 3 to realize the combination of different power supply capacities, so as to meet various requirements of equipment power supply.

Specifically, in an embodiment of the present invention, the solid-state energy cell 3 includes: an emergency power supply 13, an auxiliary power supply 14 and a main power supply 15; the power capacities of the emergency power supply 13, the auxiliary power supply 14 and the main power supply 15 are different, and the total power capacities of the three power supplies are more than twice the total power supply required by the shield.

Wherein, the solid-state energy cell 3 can be divided according to the energy demand, and in the embodiment of the present invention, it is divided into the emergency power supply 13, the auxiliary power supply 14 and the main power supply 15; the cell capacity is more than twice the required capacity of the shield. Some cells supply power for the normal construction of the shield, and the other cells are charged by remote power exchange design. The two groups are used alternately to meet the power demand of the shield machine in extreme environment, and the wind and hydropower energy with lower price can be used for power exchange to reduce the overall energy consumption of the system.

Specifically, in an embodiment of the present invention, one end of the power management system 2 is connected with the inverter system 4, and the other end is connected with the shield machine main body 11 and the shield transformer 12;

the power management system 2 includes: a power-off switching module 16, which is used for connecting the shield transformer 12 to the shield machine main body 11 and the power management system 2 during normal work, the shield machine is powered by the shield voltage device, and the power-off switching module is also used for disconnecting the shield transformer 12 when it is power off and disabled, and the shield machine is powered by the solid-state energy cell 3;

Wherein, in the embodiment of the present invention, the power-off switching module 16 realizes the function of the emergency power supply 13, and the energy device can be equipped with the solid-state energy cells 3 with different capacities according to the configuration requirements of the emergency power supply 13 of the whole machine of shield machine; during normal work, the shield transformer 12 is connected with the shield machine main body 11 and the power management system 2, the shield machine is powered by the shield transformer 12, and the solid-state energy cell 3 is in a state of charging and fully charging standby; once the shield machine is in a "disabled state" due to power failure, the power-off switching module 16 automatically switches to the solid-state energy cell 3 power supply and disconnects the shield transformer 12, so that the solid-state energy cell 3 enters a discharge state through the instruction of the power management system 2, and can keep the shield machine to complete the shutdown action in a certain period of time according to the requirements of safety operation regulations, and keep the shield machine powered in an emergency state; the emergency switching function is automatic switching in case of power failure and automatic charging in case of power-on, without personnel control. When the equipment is in a long-term power-off state, the energy device can also ensure that the shield is in an emergency power supply state for a long time by directly replacing the energy cells, and the replaced energy batteries can be transported to other charging stations for repeated replacement after charging.

Specifically, in an embodiment of the present invention, the power management system 2 also includes: a multi-mode electric energy switching module 17, which is used for switching on the emergency power supply 13, the auxiliary power supply 14 or the main power supply 15 according to the working condition requirements and switching to the emergency mode, the auxiliary power supply mode or the whole machine power supply mode.

Wherein, the multi-mode electric energy switching module 17 can automatically switch electric energy according to different working conditions, and at least has the functions of high-power short-term electric energy switching and low-power long-term electric energy switching, and supports the user-defined function of electricity demand, and can adjust the electric energy and power switched according to different working conditions; in this embodiment, it can be switched to the emergency mode, the auxiliary power supply mode or the whole machine power supply mode by connecting the emergency power supply 13, the auxiliary power supply 14 or the main power supply 15, so as to meet different shield operation requirements.

Specifically, in an embodiment of the present invention, the inverter system 4 includes: an online charging module 19, wherein the charging input module is used for controlling the charging input of the solid-state energy cell 3 during normal work; and an online discharging module 20, which is used for controlling the discharging output of the solid-state energy cell 3 when it is power off and disabled.

Wherein, in this embodiment, the inverter system 4 has the function of online charging and discharging of electric energy. That is, when the external power supply is normal, the cell is charged by the inverter system 4 through the bus; when the external power supply is disconnected, the inverter system 4 can directly supply power through the bus through the inverter system 4 without manual switching. Combined with the power management system 2, it can effectively distinguish the peak value of power consumption from the valley value of power consumption, and can control the inverter device to complete the valley value power charging and peak value power supply.

Specifically, in an embodiment of the present invention, the power management system 2 further comprises: an electric energy monitoring module 18, which is used for adjusting the number of cells connected to the system from a plurality of solid-state energy cells 3 according to the real-time charge and power factor.

Wherein, the shield machine, as a large electromechanical equipment, consumes a lot of electricity, and because of the large number of inductive devices and frequency converters used on the shield machine, the power quality of the power grid will be greatly affected during use, mainly in terms of power factor and harmonics. How to reduce the energy consumption of the shield machine and improve the power quality is also a problem that designers need to focus on; in the embodiment of the invention, the power monitoring module 18 can effectively adjust the input power device and the charging and discharging mode according to the power load and power quality of the whole machine of shield machine, which can effectively improve the power quality and reliability of the whole machine of shield machine and realize the load balance and power factor improvement. With the help of the power electronic conversion technology, the energy storage technology can realize efficient active power adjustment and reactive power control. Quickly balance the unbalanced power generated by various reasons in the system, adjust the frequency, compensate the load fluctuation, reduce the impact of disturbance on the power grid, improve the stability of the system operation and improve the power quality of users.

Specifically, in an embodiment of the present invention, the solid-state energy cell 3 is clean and environment-friendly energy.

Wherein, clean electric energy conversion is used during the whole using process of the solid-state energy cell 3, which is pollution-free, effectively avoiding waste gas, noise and other pollution caused by using diesel emergency generators in tunnels, and greatly improving the working environment of tunnel construction personnel; moreover, the design of the solid-state energy cell 3 is intrinsically safe, with the characteristics of anti-collision, flame retardancy, anti-explosion, high energy density, high power density and high power retention rate, which can successfully maximize the energy density in the narrow tunnel and meet the requirements of relevant personnel in the narrow and closed space of the tunnel.

From the above, the energy device for shield machines provided by the embodiment of the present invention, the energy device main body consists of the power management system 2, the inverter system 4 and the solid-state energy cell 3, and the trolley structure 1 is arranged below the energy device main body as a support; the trolley structure 1 is connected with the shield machine trolley 7, and moves along with the shield machine trolley 7 during construction; for electric energy output, the trolley structure 1 is equipped with the solid-state energy cell 3, and the cell is clean and environment-friendly energy to replace the diesel generator for power supply output, thus ensuring the safety and environmental protection in the use process; moreover, the solid-state energy cell 3 is connected with the power management system 2 and the inverter system 4; through the power-off switching module 16, when the external power supply works normally, the shield transformer 12 is connected with the shield machine main body 11 for power supply, and the solid-state energy cell 3 is in a charging standby state by using the power management system 2 and the inverter system 4; when the external power supply is power off and disabled, the shield machine main body 11 disconnects the shield transformer 12, and the solid-state energy cell 3 provides stable power supply output through the power management system 2 and the inverter system 4, thus completing the shield operation requirements, and the online charging and discharging function is realized through the inverter system 4; secondly, in the power management system 2, through the multi-mode switching module, the power supply mode of the cell can be changed, and the energy device can be used as the whole machine power supply. By using the power monitoring module 18, the input power device and the charging and discharging mode can be effectively adjusted according to the power load and power quality of the whole machine of the shield machine, which can effectively improve the power quality of the whole machine of the shield machine and improve the efficiency of electric power improvement and harmonic control for shield machine. According to the technical scheme provided by the present invention is safe and environment-friendly, can replace the diesel generator as the emergency energy source of shield machines, provides stable power supply, and reduces the power consumption cost of the shield machine.

The above description of the disclosed embodiments enables those skilled in the field to make or use the present invention. Many modifications to these embodiments will be obvious to those skilled in the field, and the general principles defined herein can be implemented in other embodiments without departing from the spirit or scope of the present invention. Therefore, the present invention is not to be limited to the embodiments shown herein, but is to be accorded the widest scope consistent with the principles and novel features disclosed herein.

What is claimed is:

1. An energy device for shield machines, wherein, it comprises:
    a trolley structure arranged behind the shield machine;
    a power management system arranged on the trolley structure and electrically connected with the shield machine main body;
    a solid-state energy cell arranged on the trolley structure;
    wherein, the solid-state energy cell is connected with the power management system and used for providing electric energy output;
    and an inverter system arranged between the power management system and the solid-state energy cell, wherein the inverter system is used for controlling the charging input or power supply output of the solid-state energy cell.

2. The energy device for shield machines as claimed in claim 1, wherein, the trolley structure comprises:
    a trolley main body;
    and linkage mechanisms arranged at the front and rear ends of the trolley main body;
    wherein, the trolley main body is detachably connected with the shield machine trolley through the linkage mechanism.

3. The energy device for shield machines as claimed in claim 2, wherein, the trolley structure further comprises:
    a quick disassembly mechanism arranged on the trolley main body;
    and the bottom of the solid-state energy cell is provided with a limiting displacement structure, and the quick disassembly mechanism is clamped with the limiting displacement structure for quickly assembling and disassembling the solid-state energy cell on the trolley main body.

4. The energy device for shield machines as claimed in claim 1, wherein, it also comprises:
    a quick plug-in connector arranged at the end of the solid-state energy cell.

5. The energy device for shield machines as claimed in claim 4, wherein, the solid-state energy cell is provided with one or more pieces;
    a plurality of solid-state energy cells are electrically connected with each other through the quick plug-in connector.

6. The energy device for shield machines as claimed in claim 1, wherein, the solid-state energy cell includes:
    an emergency power supply, an auxiliary power supply and a main power supply;
    the power capacities of the emergency power supply, the auxiliary power supply and the main power supply are different, and the total power capacities of the three power supplies are more than twice the total power supply required by the shield.

7. The energy device for shield machines as claimed in claim 6, wherein, one end of the power management system is connected with the inverter system, and the other end is connected with the shield machine main body and the shield transformer;
    the power management system includes:
    a power-off switching module, which is used for connecting the shield transformer to the shield machine main body and the power management system during normal work, the shield machine is powered by the shield voltage device, and the power-off switching module is also used for disconnecting the shield transformer when it is power off and disabled, and the shield machine is powered by the solid-state energy cell;
    and a multi-mode electric energy switching module, which is used for switching on the emergency power supply, the auxiliary power supply or the main power supply according to the working condition requirements and switching to the emergency mode, the auxiliary power supply mode or the whole machine power supply mode.

8. The energy device for shield machines as claimed in claim 7, wherein, the inverter system includes:
    an online charging module, wherein the charging input module is used for controlling the charging input of the solid-state energy cell during normal work;

and an online discharging module, which is used for controlling the discharging output of the solid-state energy cell when it is power off and disabled.

9. The energy device for shield machines as claimed in claim 7, wherein, the power management system further comprises:
an electric energy monitoring module, which is used for adjusting the number of cells connected to the system from a plurality of solid-state energy cells according to the real-time charge and power factor.

10. The energy device for shield machines as claimed in claim 1, wherein, the solid-state energy cell is clean and environment-friendly energy.

* * * * *